United States Patent [19]

Perry

[11] Patent Number: 5,203,883
[45] Date of Patent: Apr. 20, 1993

[54] HONING MEDIA

[75] Inventor: Winfield B. Perry, Lexington, Mass.

[73] Assignee: Dynetics Corp., Woburn, Mass.

[21] Appl. No.: 743,880

[22] Filed: Aug. 12, 1991

[51] Int. Cl.$^5$ ............................................. B24D 17/00
[52] U.S. Cl. ....................................... 51/293; 51/298; 51/304; 51/306; 51/317
[58] Field of Search ................. 51/293, 298, 304, 306, 51/308, 317

[56] References Cited

U.S. PATENT DOCUMENTS

| | | | |
|---|---|---|---|
| 2,497,021 | 2/1950 | Sterns | 51/317 |
| 3,496,677 | 2/1970 | Bodine | 51/317 |
| 3,521,412 | 7/1970 | McCarty | 51/317 |
| 3,634,973 | 1/1972 | McCarty | 51/317 |
| 3,909,217 | 9/1975 | Perry | 51/298 |
| 4,087,943 | 5/1978 | Perry | 51/306 |
| 4,850,156 | 7/1989 | Bellaire | 51/293 |

OTHER PUBLICATIONS

Amoco Chemical Company, Amoco Polybutenes, The versatile liquid polymers to improve your product, pp. 2-32.
Hack's Chemical Dictionary, 5th ed., Roger & Claire Grant, p. 461.
Condensed Chemical Dictionary, 10th ed., Gessner G. Hawley, p. 829, 1972.

Primary Examiner—Mark L. Bell
Assistant Examiner—Willie J. Thompson
Attorney, Agent, or Firm—Samuels, Gauthier & Stevens

[57] ABSTRACT

A composition for abrading, polishing, honing or deburring a surface. The composition comprises a polyboron organo silicon polymer loaded with abrasive granules. The silicon-granules are modified with a metallic soap and a polybutylene. The metallic soap and polybutylene are gelled prior to blending with the polymer.

18 Claims, No Drawings

HONING MEDIA

FIELD OF THE INVENTION

The invention relates to a flowable, abrasive composition comprising a viscous carrier laden with abrasive granules for honing, abrading, deburring a surface, especially by reciprocating said composition along the surface under pressure and at varying velocities.

BACKGROUND AND BRIEF SUMMARY OF THE INVENTION

The present invention is an improvement of the composition described in U.S. Pat. No. 4,087,943. The composition of the '943 patent, although satisfactory, did not always have the homogeneity desired and exhibited an 'oily' feel. Also, it was found that there occurred lot variations in the hydrocarbon oil, one of the components of the gel which modified the polymer.

In the present invention, the hydrocarbon oil of the '943 patent is replaced with a polybutene and surprisingly an abrasive composition with substantially better homogeneity results which also has a less oily feel.

The present invention provides a flowable abrasive composition for honing, abrading, deburring or polishing the surfaces of an object which composition has a desired homogeneity and consistency prior to use and has the valuable advantages of substantially retaining its homogeneity and consistency and effectiveness during use, even under conditions of pressure and velocity and the associated high temperatures due to friction.

The composition comprises a polyboronorgano silicon (polymer) compound loaded with abrasive granules and modified with a metallic soap and a polybutene. In the preferred embodiment, the metallic soap and polybutene are gelled prior to blending with the polymer.

The composition in some formulations exhibits tackiness and the inclusion of a mineral oil eliminates the tackiness. The composition may be further modified by the addition of small quantities of couplers and/or lubricants as is known in the art.

DESCRIPTION OF THE PREFERRED EMBODIMENTS

A silicon polymer alone loaded with abrasive granules is not entirely satisfactory for honing surfaces of an object, but when modified such as with a gel formed from a metallic soap and a polybutene, it is soft and readily flowable and has a consistency varying between a paste and a biscuit dough during the mixing thereof and during use. The composition possesses various degrees of inner lubricity.

The polymer is made by reacting a silicone oil, e.g., polydimethylsiloxane with a boron compound, e.g., boric acid, boric acid anhydride and others in the presence of a catalyst, i.e. a Lewis acid catalyst, with heat and agitation followed by treatment with ammonium carbonate or ammonia to neutralize any residual Lewis acid catalyst.

The abrasive component of the composition can be any conventional abrasive material used in such honing compositions, such as silicon carbide, alumina, boron carbide and the like. The size of the grit may vary over a wide range depending on the job to be done and the physical properties desired in the composition. Thus, the size may vary from 14 mesh to 600 mesh, and in some cases, it may be as low as 2 to 5 microns. It has been found that often larger abrasive sizes are employed for heavier work, substantially better results are achieved by using finer abrasive sizes in combination with the larger particles.

The amount of abrasive relative to the remainder of the composition (gel and the polymer) is at least 25% by weight of the composition, preferably varies between 50 and 300% by weight of the composition and most preferably varies between 100 and 200% by weight of the composition.

The gel used to modify the polymer is formed by the blending of a metallic soap with a polybutene.

The metallic soap component of the gel, as is known in the art, is a salt, preferably substantially water insoluble of a fatty carboxylic acid usually having from 8 to 22 carbon atoms, typical examples including aluminum, beryllium, cadmium, calcium, lithium, magnesium and zinc salts of acids such as lauric acid, stearic acid, oleic acid, linoleic acid, linolenic acid, palmitic acid, behenic acid and mixtures thereof. Frequently, these salts or fatty acids or metallic soaps are by common usage referred to as metallic stearates, which term includes not only the insoluble metallic salts of stearic acid but also a wide variety of other high-molecular weight organic acids as well. The aluminum salts are preferred as they form the most stable gels and those materials known in the art as aluminum stearates are most preferred.

In the prior art the polybutene is suggested for use as caulks and sealants and to modify rubber. Further the art, and specifically an Amoco Polybutene Products Brochure teaches that the polybutene can be gelled using metallic stearates. However, the art does not teach its compatibility with silicon rubber and does not suggest that the gel would be suitable in a honing or abrading composition.

The polybutene used in the formation of the gel can be any of several thermoplastic isostatic polymers, i.e. isobutenes of various molecular weights. Preferably, an Amoco polybutene identified as L-14 is used.

The gel is formed by mixing from 1 to 35% by weight, preferably from 3 to 15% of the metallic soap with the polybutene and heating the mixture to a temperature in excess of the gelation temperature, preferably to between 10° to 20° F. in excess of the gelation temperature, and holding at this temperature for a period of at least 15 minutes.

To provide the flowable abrasive composition in accordance with the invention, the polymer is thoroughly kneaded together with the gel until it is homogeneous and has the desired ductility, softness, flowability and viscosity. The grit or abrasive is then thoroughly and intimately mixed with the composition with stirring to provide a composition ready for use.

The amount of gel added to the polymer is dependent upon the properties of the gel and the consistency desired in the final composition. This in turn is dependent upon the use of the abrasive composition. For example, in abrading a relatively small opening, i.e. ⅛ inch in diameter and smaller, conditions of relatively high pressure and velocity are encountered and a relatively free-flowing abrasive composition having paste-like consistency is desirable. This can be accomplished with a high concentration of a stiffer gel. Alternatively, where the abrasive composition is to be used for abrading the interior of a relatively large passageway where pressure and velocity are relatively low, then a stiffer abrasive composition having a consistency of a biscuit dough is desirable. This is accomplished by use of a soft gel in low concentration. In general, with the foregoing as a guideline, the ratio of the gel to the polymer may vary between 1 to 4 and 4 to 1, preferably varies between 1 to 2 and 2 to 1 and most preferably is about 1 to 1.

Where some of the formulations of the composition exhibit tackiness, a mineral oil, preferably a paraffinic oil, i.e. Drakeol 34, can be used as an additive in a weight ratio of 5-12 to 100, oil to polybutene.

The following examples will be described with reference to making the composition of the invention by blending the polymer with a gel, formed from a metallic soap and a polybutene, and an abrasive material. However, in an alternative embodiment, compositions of the invention can be made without first forming the gel. For example, a metallic soap, such as aluminum distearate can be mixed directly with the polymer and polybutene to form the composition without the necessity of first forming a gel and then subsequently mixing the gel with the polymer. Any metallic soap as defined above can be used but aluminum distearate is preferred.

When the polymer, by weight, is equal to or greater than the other components of the composition, by weight, gelling does not appear to be necessary. However, whether or not the soap-polybutene is gelled is a matter of choice based on the components used, the amounts of the components and the process conditions.

EXAMPLE I

A polymer was formed from 50 pounds of a dimethyl silicone oil, $\frac{7}{8}$ pound of $FeCl_3.6H_2O$ (Lewis acid catalyst) and 7 pounds of boric acid by reaction at a temperature of 200°-250° C. with agitation to form a highly viscous boro organo silicon heteropolymer. This heteropolymer was reacted with 2½ pounds of $(NH_4)2CO_3$ to neutralize any acid residue. The resulting material was somewhat brittle, stiff and crumbly.

A gel was formed by adding 3 pounds of aluminum stearate (Nuodex High Gel 1, Huls America Inc.) to 40 pounds of polybutene (Polybutene L-14) and 5 pounds of paraffinic oil (Drakeol 34) at room temperature with stirring. The mixture was then heated to the gelation temperature of approximately 200° F. and held at that temperature for 15 minutes to form a relatively thick gel.

Fifty pounds of the polymer were mixed into the gel at a temperature of approximately 250° F. After thorough mixing, the mixture was cooled and kneaded until it was homogeneous.

Thereafter, 100 pounds of silicon carbide abrasive particles having an average particle size of 100 mesh were mixed with the polymer composition. At this point the mixture had a pastelike consistency.

The resulting abrasive mixture was pumped at a pressure of 450 psi back and forth 10 times through ¼ inch holes of test washers made of steel, the pressure drop through these holes caused the mixture to squirt through the holes at a high velocity.

The resultant action was complete removal of burrs from the edges of the holes and excellent surface finish on the walls of the holes.

EXAMPLE II

A polymer was formed from 50 pounds of a dimethyl silicone oil, ⅞ pound of $FeCl_3.6H_2O$ (Lewis acid catalyst) and 7 pounds of boric acid by reaction at a temperature of 200°-250° C. with agitation to form a highly viscous boro organo silicon heteropolymer. This heteropolymer was reacted with 2½ pounds of $(NH_4)2CO_3$ to neutralize any acid residue. The resulting material was somewhat brittle, stiff and crumbly.

A gel was formed by adding 1½ pounds of aluminum stearate (Nuodex High Gel 1, Huls America Inc.) to 20 pounds of polybutene (Polybutene L-14) and 5 pounds of paraffinic oil (Drakeol 34) at room temperature with stirring. The mixture was then heated to the gelation temperature of approximately 200° F. and held at that temperature for 15 minutes to form a relatively thick gel.

Fifty pounds of the polymer were mixed into the gel at a temperature of approximately 250° F. After thorough mixing, the mixture was cooled and kneaded until it was homogeneous.

Thereafter, 150 pounds of silicon carbide abrasive particles having an average particle size of 36 mesh were mixed with the polymer composition. At this point the mixture had a pastelike consistency.

The resulting abrasive mixture was pumped at a pressure of 450 psi back and forth 10 times through ¼ inch holes of test washers made of steel, the pressure drop through these holes caused the mixture to squirt through the holes at a high velocity.

The resultant action was complete removal of burrs from the edges of the holes and excellent surface finish on the walls of the holes.

EXAMPLE III

A polymer was formed from 50 pounds of a dimethyl silicone oil, ⅞ pound of $FeCl_3.6H_2O$ (Lewis acid catalyst) and 7 pounds of boric acid by reaction at a temperature of 200°-250 C. with agitation to form a highly viscous boro organo silicon heteropolymer. This heteropolymer was reacted with 2½ pounds of $(NH_4)2CO_3$ to neutralize any acid residue. The resulting material was somewhat brittle, stiff and crumbly.

A gel was formed by adding 8 pounds of aluminum stearate (Nuodex High Gel 1, Huls America Inc.) to 100 pounds of polybutene (Polybutene L-14) and 5 pounds of paraffinic oil (Drakeol 34) at room temperature with stirring. The mixture was then heated to the gelation temperature of approximately 200° F. and held at that temperature for 15 minutes to form a relatively thick gel.

Fifty pounds of the polymer were mixed into the gel at a temperature of approximately 250° F. After thorough mixing, the mixture was cooled and kneaded until it was homogeneous.

Thereafter, 100 pounds of silicon carbide abrasive particles having an average particle size of 220 mesh were mixed with the polymer composition. At this point the mixture had a pastelike consistency.

The resulting abrasive mixture was pumped at a pressure of 450 psi back and forth 10 times through 1/16 inch holes of test washers made of steel, the pressure drop through these holes caused the mixture to squirt through the holes at a high velocity.

The resultant action was complete removal of burrs from the edges of the holes and excellent surface finish on the walls of the holes.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described the invention, what is now claimed is:

1. A method of abrading or polishing or honing or deburring a surface comprising flowing under pressure and at a high velocity through a restricted passage onto a surface to be abraded, polished, honed or deburred, an abrasive composition comprising:
   a mixture of a boron-dialkyl silicon-oxygen polymer;
   a metallic soap of a fatty carboxylic acid having 8 to 22 carbon atoms and a polybutene; and having abrasive grit particles dispersed in said mixture said high velocity being achieved by pressure drop across said restricted passage.

2. The method of claim 1 wherein the abrasive grit particles are dispersed in the mixture in an amount of between 25 to 300% based on the combined weight of the polymer and metallic soap-polybutene.

3. The method of claim 2 wherein the abrasive grit particles are dispersed in an amount of between 100 to 200% based on the combined weight of the polymer and metallic soap-polybutene.

4. The method of claim 1 wherein the metallic soap is mixed with the polybutene in an amount of between 1 to 35% based on the weight of the polybutene.

5. The method of claim 1 wherein the ratio of metallic soap-polybutene to polymer varies between 1 to 4 and 4 to 1.

6. The method of claim 5 wherein the ratio of metallic soap-polybutene to polymer varies from 1 to 2 and 2 to 1.

7. The method of claim 6 wherein the ratio is 1 to 1.

8. The method of claim 1 wherein the mixture includes a paraffinic oil.

9. The method of claim 1 wherein the metallic soap and polybutene are gelled.

10. A composition for abrading or polishing or honing or deburring a surface which comprises:
    a mixture of a boron-didialkyl silicon-oxygen polymer;
    a metallic soap of a fatty carboxylic acid having 8 to 22 carbon atoms and a polybutene; and having abrasive grit particles dispersed in said mixture.

11. The composition of claim 10 wherein the abrasive grit particles are dispersed in the mixture in an amount of between 25 to 300% based on the combined weight of the polymer and metallic soap-polybutene.

12. The composition of claim 11 wherein the abrasive grit particles are dispersed in an amount of between 100 to 200% based on the combined weight of the polymer and metallic soap-polybutene.

13. The composition of claim 10 wherein the metallic soap is mixed with the polybutene in an amount of between 1 to 35% based on the weight of the polybutene.

14. The composition of claim 10 wherein the metallic soap and polybutene are gelled.

15. The composition of claim 10 wherein the ratio of metallic soap-polybutene to polymer varies between 1 to 4 and 4 to 1.

16. The composition of claim 15 wherein the ratio of metallic soap-polybutene to polymer varies from 1 to 2 and 2 to 1.

17. The composition of claim 16 wherein the ratio is 1 to 1.

18. The composition of claim 10 which includes a paraffinic oil.

* * * * *